(12) United States Patent
Edlinger et al.

(10) Patent No.: US 6,288,844 B1
(45) Date of Patent: Sep. 11, 2001

(54) LIGHT SPLITTER AND OPTICAL TRANSMITTER CONFIGURATION WITH A LIGHT SPLITTER

(75) Inventors: Johannes Edlinger, Frastanz (AT); Claus Heine, Chur (CH)

(73) Assignee: Unaxis Balzers Aktiengesellschaft, Balzers (LI)

( * ) Notice: Subject to any disclaimer, the term of this patent is extended or adjusted under 35 U.S.C. 154(b) by 0 days.

(21) Appl. No.: 09/267,475

(22) Filed: Mar. 11, 1999

(30) Foreign Application Priority Data

Feb. 4, 1999 (CH) .................................................. 207/99

(51) Int. Cl.⁷ .............................. G02B 27/14; G02B 27/12
(52) U.S. Cl. ............................................. 359/634; 359/639
(58) Field of Search .................................... 359/634, 629, 359/638, 640

(56) References Cited

U.S. PATENT DOCUMENTS

| | | | |
|---|---|---|---|
| 5,786,937 | * 7/1998 | Chu et al. | 359/583 |
| 5,808,795 | * 9/1998 | Shimomura et al. | 359/488 |
| 5,828,489 | * 10/1998 | Johnson et al. | 359/487 |
| 5,829,854 | 11/1998 | Jones | 353/33 |
| 5,914,817 | * 6/1999 | Browning et al. | 359/634 |
| 5,946,056 | * 8/1999 | Ishibashi et al. | 349/9 |
| 5,982,541 | * 6/1999 | Li et al. | 359/497 |
| 6,097,544 | * 8/2000 | Edlinger et al. | 359/634 |
| 6,172,815 | * 1/2001 | Hashizume et al. | 359/640 |

FOREIGN PATENT DOCUMENTS

| 0468501 | 1/1992 | (EP) | G02B/5/28 |
|---|---|---|---|
| 0752608 | 1/1997 | (EP) | G02F/1/13 |

* cited by examiner

Primary Examiner—Ricky Mack
Assistant Examiner—Saeed Seyrafi
(74) Attorney, Agent, or Firm—Notaro & Michalos P.C.

(57) ABSTRACT

A spectrally selective light splitter divides white light into red, green and blue light or recombines white light from red, green and blue light using two separate coating systems. Each system reflects and transmits color selectively, and are applied or embedded on or in at least one transparent base body, with at least one of the coating systems is made up of at least one layer of a material with lower refractive index as well as at least one layer of a material with higher refractive index. For the lower refractive index $N_{LS}$: $1.7 \leq N_{LS} \leq 2.1$ and the reflective index $N_k$ of at least the transparent base body on which the system is applied follows the rule: $1.52 \geq N_k \geq 1$.

58 Claims, 11 Drawing Sheets

LIGHT SPLITTER AND OPTICAL TRANSMITTER CONFIGURATION WITH A LIGHT SPLITTER

FIELD AND BACKGROUND OF THE INVENTION

The present invention relates to light splitters as well as an optical transmitter configuration with a light splitter.

The present invention is based on problems such as were recognized when employing X-cubes and will be explained in the following. But the findings can, in principle, be transferred to optical light splitters which, as will yet be explained, are used in connection with light of different polarization. Regarding this topic, reference can be made to A. Thelen, "Nonpolarizing interference films inside a glass cube", Appl. Optics, Vol. 15, No. 12, December 1976.

For example, in DE 40 33 842 a cuboid optical structural component composed of single prisms with dichroic layers is referred to as a "dichroic prism".

In the present document the expression

X-cube is used for such a structural component. With respect to such X-cubes reference is made to U.S. Pat. Nos. A 2,737,076, 2,754,718, DE A 40 33 842 as well as to JP 7 109443, further to U.S. Pat. No. 5,098,183, and EP A 0 359 461. Furthermore, reference is made to WO98/20383 by the same applicant.

Definitions

Figure 1:
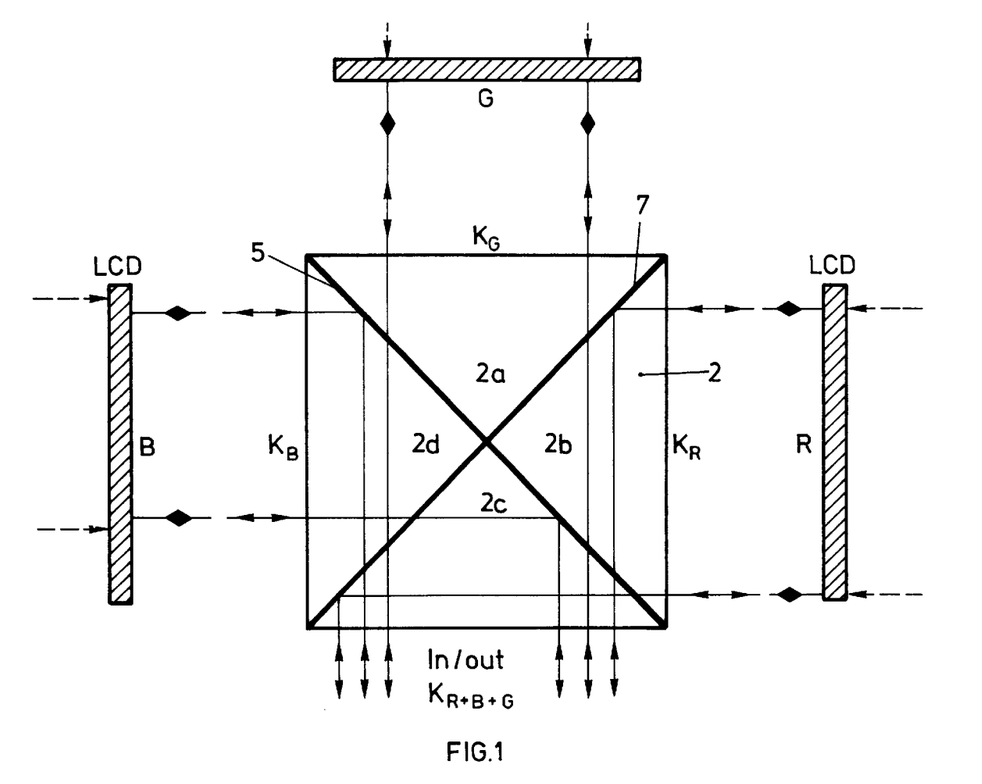
FIG. 1 is a schematic optical transmission configuration of an x-Cube.

The following definitions are used:

Light, visible light: light with maximum energy in the spectral range 380 nm–720 nm red light: light with maximum energy in the spectral range 580 nm–720 nm, in particular in the spectral range 600 nm–680 nm green light: light with maximum energy in the spectral range 490 nm–605 nm, in particular in the spectral range 500 nm–600 nm blue light: light with maximum energy in the spectral range 380 nm–510 nm, in particular in the spectral range 420 nm–500 nm yellow light: light with maximum energy in the spectral range 475 nm–605 nm, in particular at 582±3 nm white light: light with red, blue and green light components transparent: negligible absorption in the spectral range 380 nm–720 nm cube: spatial shape formed by identical rectangles pairwise opposing each other in parallel First, the fundamental effect of an X-cube will be explained with reference to FIG. 1. Optic light splitters of this type are employed primarily in projectors in order to separate white light into red, green and blue light or to recombine the latter into white light. According to FIG. 1, an X-cube comprises four single prisms $2a$–$2d$. The prisms commonly comprise BK7 glass. In cross section they form right-angled isosceles triangles with an angle of 90°. The length of the hypotenuse is, for example, between 5 mm and 50 mm, preferably 20–30 mm. Between the two prism pairs $2a$ and $2b$, on the one hand, and $2d$ and $2c$, on the other, a spectrally selectively reflecting and transmitting coating system 5 is embedded, which largely reflects blue light but largely transmits green and red light.

Between the two prism pairs $2a$ and $2d$, on the one hand, and $2b$ and $2c$, on the other hand, a further spectrally selectively reflecting and transmitting coating system 7 is embedded which largely reflects red light, however largely transmits green and blue light.

Consequently, on the X-cube three channels result for red, green and blue light, $K_R$, $K_G$, $K_B$ and one channel $K_{R+B+G}$ for white light. On each of the coating systems 5, 7, between the addressed prism pairs, reflection at 45° of the incident light, thus colored light, takes place. The hypotenuse faces of the prisms 2 can be coated with an antireflection coating system.

Such X-cubes are mainly used today in projection apparatus in order to recombine red (R), blue (B), and green (G) light, each of which is supplied via light valves, in particular LCD light valves, operating in transmission to the associated channels $K_R$, $K_B$, $K_G$ in channel $K_{R+B+G}$ into white light. This is indicated in FIG. 1 in dashed lines. Light valves are therein image-forming elements comprising a multiplicity of individually driven pixels. The number of pixels therein yields the resolution according to EVGA, SGA, EGA, or XGA standards, etc.

Due to the printed conductor and the driving electronics a lower limit of the pixel size exists in the case of such light valves operating in transmission and it is only with difficulty possible to attain sizes below this limit. When decreasing the pixel size, furthermore, the optical aperture per pixel decreases.

This restriction does not apply in light valves which do not work in transmission but rather, as shown in solid lines using light valves LCD in FIG. 1, operate in reflection and therein rotate the plane of polarization of the reflected light by 90°.

Figure 2:
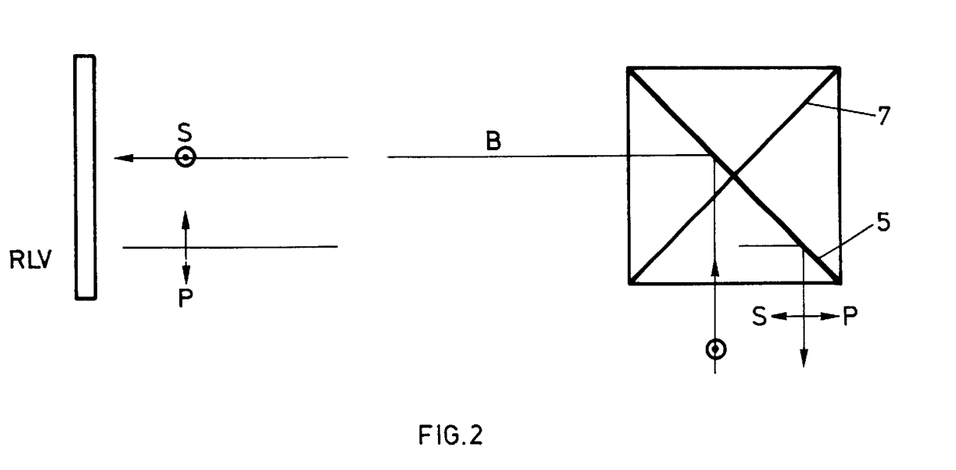
FIG. 2 illustrates conditions occurring when replacing conventional light valves.

The use of such light valves operating in reflection has been hindered until today by problems which will be explained later. In FIG. 2 the conditions are shown which obtain when replacing conventional light valves, which, according to FIG. 1, are LCD valves operating in transmission, by light valves RLV, which are reflective light valves operating in reflection. If, to the configuration according to FIG. 1, a light valve RLV operating in reflection is connected according to FIG. 2, for example, reflected S-polarized (direction of oscillation of the E field) blue light B reflected on coating system 5 of the X-cube according to FIG. 1, is converted on the light valve RLV into P-polarized blue light and reflected back onto the coating system 5 and, again, reflected by the latter. On one and the same coating system 5, according to FIG. 2, and, analogously, for red light on system 7, reflections of light of identical spectra but different polarizations occur.

Spectrally selectively reflecting and transmitting coating systems, such as are used in said X-cubes but also in other light splitters for color-selective effects, are conventionally produced by means of dielectric multicoating systems. These comprise each at least one layer of a material with lower refractive index and one layer of a material with higher refractive index. For example, as the material with lower refractive index $SiO_2$ is conventionally used, with a refractive index of 1.46. As the material with higher refractive index, for example, $TiO_2$ is used today with a refractive index of 2.4 or $Ta_2O_5$ with a refractive index of 2.1.

Figure 3:
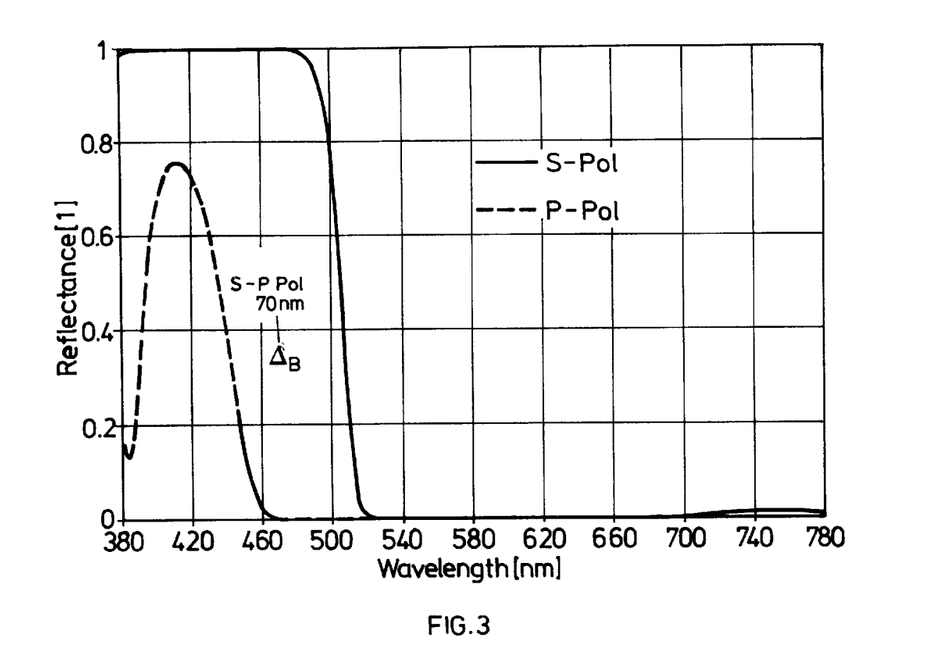

In FIG. 3 the reflection of S-polarized blue light on a color-selective coating system comprising $SiO_2/TiO_2$ is shown as well as that of P-polarized blue light on the same coating system. Both measurements took place at an angle of light incidence of 45°, as depicted in FIG. 2.

Figure 4:
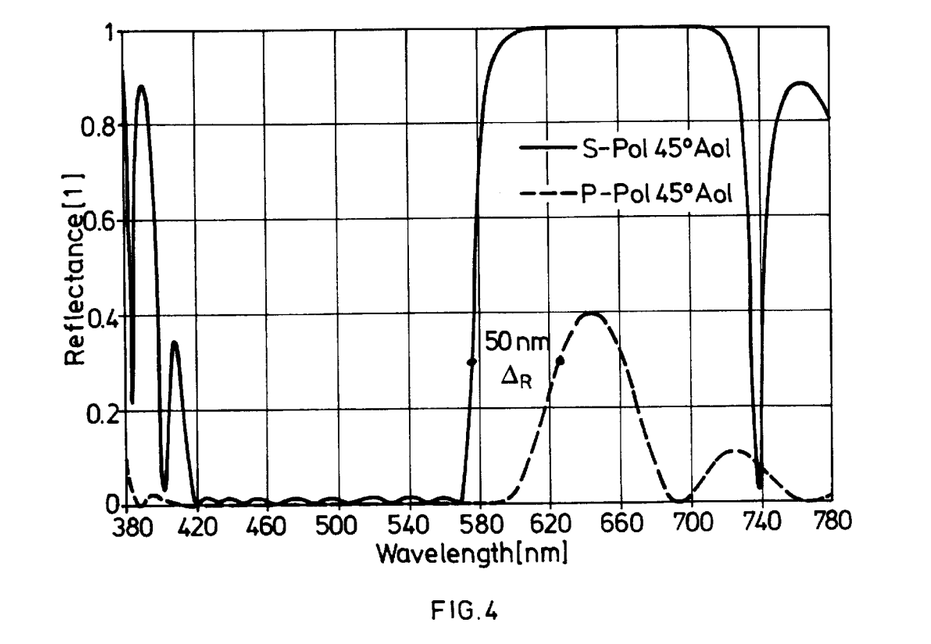

In FIG. 4 is shown on a coating system again composed of $SiO_2/TiO_2$ layers and selectively reflecting red light R, the reflection behavior of S-polarized and of P-polarized red light. The measurements of FIGS. 3, 4 were carried out on an X-cube with BK7 glass as the base body material wherein the listed color-selective coating systems 5, 7 or FIG. 2 were embedded.

In FIGS. 3 and 4 is evident that, on the one hand, in both cases the reflection of P-polarized light is significantly less than that of S-polarized light, quite pronounced on the red-selective coating system, and that further a marked edge shift—polarization shift—of the reflected spectra takes place. For example, with selective reflection of blue light the 50% reflection points for S- and P-polarization are spaced over 70 nm apart, corresponding to $\Delta_B$.

If in FIG. 2 the represented path of rays is considered, without taking into account the second color-selective coating system 7 provided on the X-cube, thus only the reflection on one coating system, namely the coating system 5 for blue light, one obtains $$I'^P_{Bout} = I^S_{in} \cdot R^S_{RB} \cdot R^P_{RB} \qquad (1)$$

where $I^P_{Bout}$: intensity of the P-polarized blue light reflected back by coating system 5, $I^S_{in}$: intensity of the S-polarized blue light incident on coating system 5, $R^S_{RB}$: the reflection of the blue-selective coating system 5 for S-polarized blue light, $R^P_{RB}$: the reflection of the blue-selective coating system 5 for P-polarized blue light.

Figure 5:
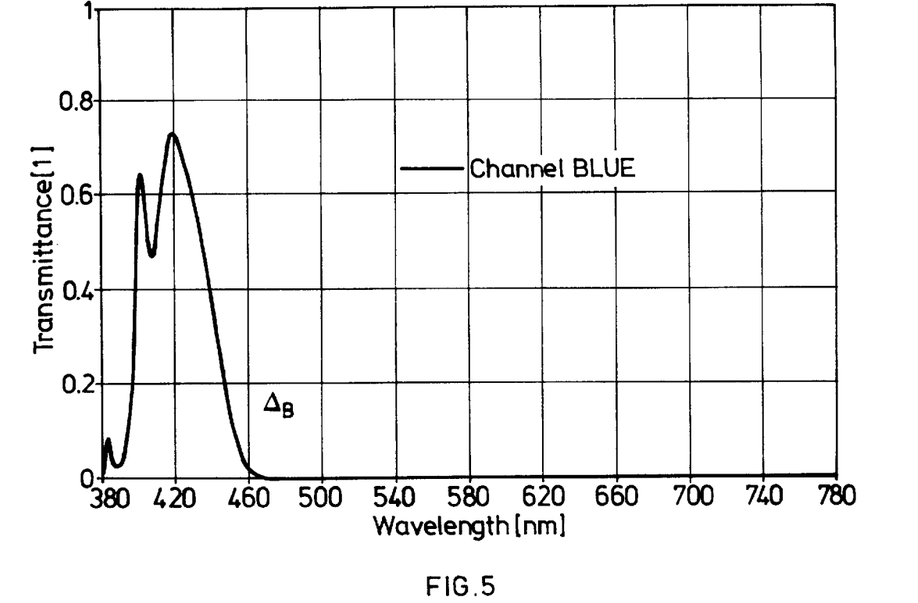
Figure 6:
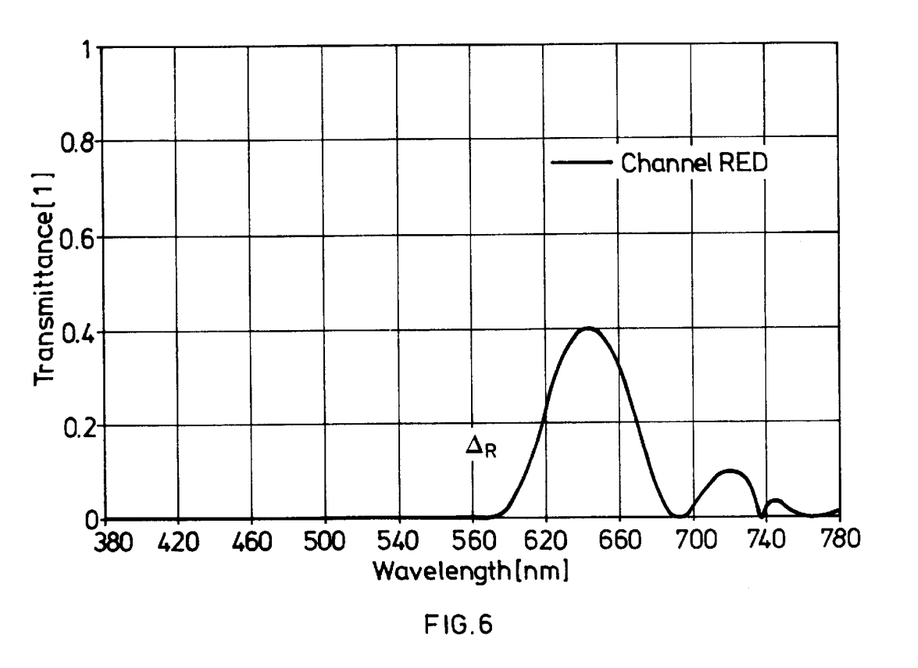

Starting from the reflection behavior shown in FIGS. 3 and 4 for blue light B on coating system 5 according to FIG. 2 and, analogously, for red light R on coating system 7, taking into consideration the particular transmitting coating systems, thus system 7 for blue light B or system 5 for red light R, respectively, intensity spectra for $I^P_{Bout}$ or for $I^P_{Rout}$ are obtained as shown in FIG. 5 or FIG. 6, respectively. Taking into consideration the stated transmissions, as well as according to FIG. 2 the reflection behavior of a potentially added light valve RLV operating in reflection, for blue light is obtained:

$$I^P_{Bout} = I^S_{in} \cdot T^S_{RR} \cdot R^S_{RB} \cdot R_{RLVB} \cdot R^P_{RB} \cdot T^P_{RR} \qquad (2)$$

Therein denote further $T^S_{RR}$: the transmission of the red-selective coating system 7 for S-polarized light $R_{RLVB}$: the reflection of the light valve $T^P_{RR}$: the transmission of the red-selective coating system 7 for P-polarized light.

The expression for red light is obtained analogously.

The differing reflection properties of the selective red or blue coating systems with respect to S- and P-polarization lead to serious consequences:

The light from the spectral ranges $\Delta_B$ or $\Delta_R$ between the S- and P-reflection spectra according to FIGS. 3 and 4 is not output but passes correspondingly the blue or red reflector and remains as scattered light in the system, according to FIG. 2 in the X-cube.

Figure 7:
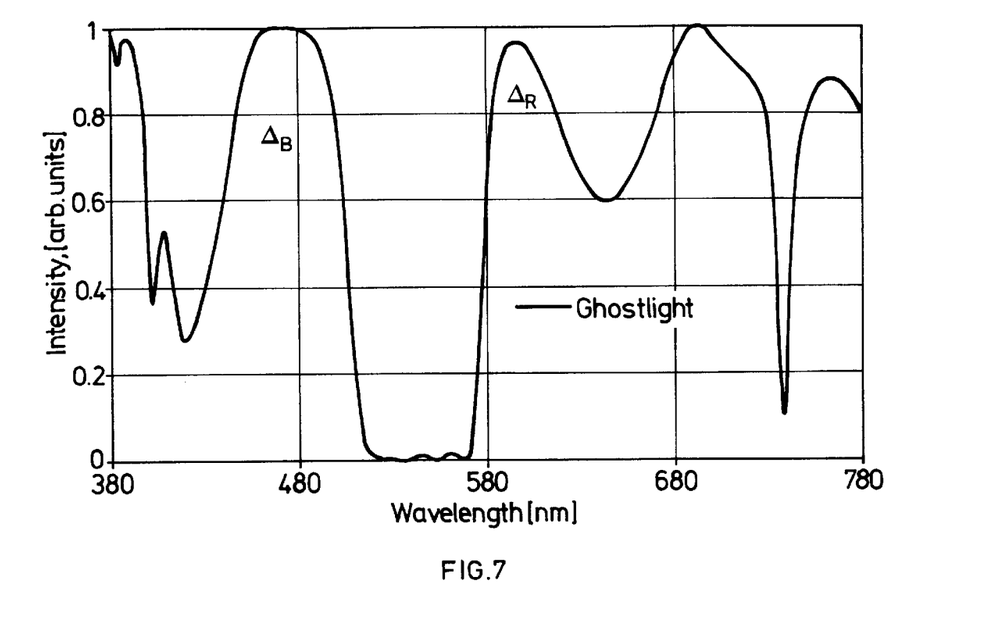

In FIG. 7 the spectrum of the scattered light in the X-cube is shown with the stated intermediate spectral ranges $\Delta_B$ and $\Delta_R$ according to FIGS. 3 and 4 entered.

It is evident that a large quantity of scattered light remains in the system. Further, as evident in FIGS. 5 and 6, the total transmission in the red spectral range as well as also in the blue is insufficient, i.e. substantially less than it would be, in view of FIG. 2, if on both color-selective coating systems 5 and 7 only S-polarized light were to be reflected.

SUMMARY OF THE INVENTION

Starting from the described problems, the present invention poses the task of creating light splitters of the above stated type in which the differing color-selective behavior of the coating systems with respect to differently polarized light, is reduced or corrected, or to create an optical transmitter configuration with a light splitter with which this is also attained. As the light splitter of the transmitter configuration according to the invention is preferably used in combination a light splitter according to the invention.

Further, the scattered light in the light splitter or in the transmitter configuration is to be minimized and, if appropriate, the color location is to be optimized.

This task is solved, on the one hand, in the case of a light splitter of the type described in the introduction thereby that for the lower refractive index $N_{LS}$ applies:

$$1.70 \leq N_{LS} \leq 2.1.$$

As will yet be explained, this leads to the fact that the edge shift $\Delta$—the polarization shift—of the P- and S-reflection spectra, as explained in conjunction with FIGS. 3 or 4, is substantially reduced and, in addition, the reflection of P-polarized light is approximated to the value for S-polarized light.

In a preferred embodiment, the refractive index $N_{LS}$ is selected as:

$$N_{LS} = 1.8 \pm 2\%$$

As the material with higher refractive index is preferably used a material comprising at least as the major component an oxide or oxynitride, therein preferably a material from the series $TiO_2$, $Ta_2O_5$, $Nb_2O_5$, $HfO_2$, $ZrO_2$, $SiO_xN_y$, especially preferred $TiO_2$ and/or $Ta_2O_5$. All of these materials have indices of refraction of maximally 2.1.

The lower refractive index $N_{LS}$ selected according to the invention is preferably controlled thereby that as the associated material a mixed material is used comprising at least two materials $m_1$ and $m_2$, for the refractive index $N_{m1}$, $N_{m2}$, to which applies:

$$N_{m1} \geq 1.05 N_{LS}$$

$$N_{m2} \leq 0.95 N_{LS}.$$

The first material $m_1$ of the mixed material is preferably also a material used as the material with the higher refractive index, thus an oxide or oxynitride, therein preferably at least one of the above listed materials $TiO_2$, $Ta_2O_5$, $Nb_2O_5$, $HfO_2$, $ZrO_2$, $SiO_xN_y$, especially preferred $TiO_2$ and/or $Ta_2O_5$.

As the second material $m_2$ of the mixed material is preferably used $SiO_2$ and/or $Al_2O_3$ and/or $SiO_xN_y$ and/or $Y_2O_3$. By selecting the mixing ratio $m_1/m_2$ of the mixed material, the material with the lower refractive index, the desired refractive index $N_{LS}$ is realized {thereon}. As the material with the lower refractive index, a mixed material is preferably used comprising $SiO_2$ and $TiO_2$, with an $SiO_2$ fraction $A_{SiO2} = (60 \pm 5)\%$ and a $TiO_2$ fraction $A_{TiO2}$ of $(100\% - A_{SiO2})$. $Y_2O_3$, having a refractive index of $1.8 \pm 2\%$, can therein also be used as the material with the lower refractive index.

The refractive index $N_K$ of the material of the at least one base body is preferably selected as follows:

$$1.52 \geq N_K \geq 1.$$

The value 1.52 corresponds therein to the refractive index of BK7 glass which is commonly used in particular for X-cubes. The stated body can also be fabricated of quartz glass with $N_K=1.45\pm2\%$.

It is preferred if on the light splitter according to the invention both coating systems are implemented like said at least one. Furthermore, according to the invention and especially preferred, a light splitter implemented as an X-cube of the above described type is proposed, in which the coating systems are embedded substantially along diagonal planes of a base body cuboid which is preferably square in a cutting plane perpendicular to the common line of intersection of the coating systems.

To summarize: thus a formulation according to the invention of the solution of the above task is the specific selection of materials of the described coating systems.

A second solution of the above task is attained through a spectrally selective light splitter. In such a light splitter, which splits white light into red, green and blue light, respectively recombines white light from red, green and blue light, with two separate coating systems, each reflecting and transmitting color selectively, which are applied, or are embedded, on or in at least one transparent base body and on which the body defines emergent faces for the red, green and, respectively, blue light, at least one of the emergent faces with respect to the direction of the light emerging from it and reflected on at least one of the coating system is tilted such that the face normal of the emergent face forms with the stated direction an acute angle $\phi$ which differs from 0°. Due to fabrication tolerances on the light splitter, angles between light emergent direction and the face normal differing from 0° may well occur in this case, but, on the one hand, such tolerance-dependent angle deviations are not reproducible and, on the other hand, the tolerance-dependent angle deviations due to production are prior known. The zero deviation realized according to the invention, in any event, is greater than the stated prior known tolerance deviation.

Preferably, and as yet to be explained, the addressed maximum angle deviations are 5°.

It is now possible to apply directly onto the emergent faces on such a light splitter light valves, operating in reflection with respect to the coating systems, for example according to FIG. 2, light in S-polarization, incident on a considered coating system and to be spectrally divided, is reflected on the coating system at a different angle than the P-polarized light to be recombined of the same spectrum reflected by light valve RLV.

However, the possibility also exists of realizing the reflection angle shift on one and/or the other coating system without corresponding tilting of the emergent faces on the light splitter itself, i.e. without changing the light splitter itself by mounting the light valves at a corresponding relative tilt.

A corresponding optical transmitter configuration with a light splitter, with an incident and emergent face for white light and emergent faces each for red, blue and green light, comprises reflectors, operationally connected with the emergent faces of the stated light splitter, which reflectors change the polarization of light and on which the light emergent at the emergent faces is reflected at an angle deviating from 0° by more than is given through the fabrication tolerances of the total configuration. Such an optical transmitter configuration can now be realized through the direct application of light valves, operating in reflection, onto the tilted emergent faces of a light splitter, or the reflector tilt can be realized through mechanical mounting measures, apart from the light splitter implementation proper.

The light splitter according to the invention considered by itself comprises preferably in combination the measures with respect to layer material as well as also the measures of realizing on the coating systems differing reflection angles specific to the direction of the incidence of rays, as is specified by the light slitter according to claim 10. Furthermore, an optical transmitter, in principle with tilted reflectors, preferably comprises also the solution characteristics with respect to specific layer materials on the light splitter as specified according to the wording of claim 13.

Each of the principles according to the invention, namely the material selection according to the invention of one, preferably of both of the coating systems and/or reflection specific as to direction of incidence on at least one, preferably on both coating systems, now permits working with reflecting light values in particular also in the case of projector configurations.

An optical transmitter configuration, on which according to claim 12, the stated tilt is realized and/or which comprises a light splitter with the material selection according to the invention of the coating systems, preferably comprises further a polarization beam splitter at the input side and/or an HMI lamp as an illumination source.

Said HMI lamp has in its light spectrum low energy values where the range of spectral shift range also is located of the reflection behavior with respect to S- and P-polarized light, i.e. corresponding to the spectral ranges $\Delta_R$ and $\Delta_B$ according to FIGS. 3 and 7.

BRIEF DESCRIPTION OF THE DRAWINGS

The invention will now be explained further by example with reference to the Figures.

Therein depict:

FIGS. 3, 4, 5, 6 and 7 are each graphs plotting reflectants or intensity of light against wavelength, FIG. 8 the reflection of blue light on a light splitter according to the invention with a layer material selection according to the invention for S- and P-polarizations, FIG. 9 in a representation analogous to FIG. 8 the reflection resulting with the layer material selection according to the invention of red light in S- and P-polarization, FIG. 10 the total transmission of blue light in an X-cube with the layer materials selected according to the invention, i.e. with coating systems which in each instance lead to the results according to FIGS. 8 and 9, as well as the spectrum of an HMI lamp, FIG. 11 in a representation analogous to FIG. 10 the spectrum of the total transmission of red light as well as of said HMI lamp registered on the same X-cube, FIG. 12 the spectrum of the scattered light resulting on said X-cube according to the invention as well as of said HMI lamp, FIG. 13 schematically a first optical transmitter configuration according to the invention in the form of a projection configuration according to the invention with a light splitter according to the invention with the materials of the coating systems selected according to the invention, FIG. 14 schematically and only shown with one of the coating systems, an X-cube and light valve configuration in order to explain the invention under the aspect of its tilt with respect to red light, FIG. 15 in a representation analogous to FIG. 14, the conditions for blue light, FIG. 16 a simple realization possibility of the invention under the aspect of its tilt using a conventionally formed X-cube, and FIG. 17 spectra of the red and blue light in order to explain the effect of the tilt according to the invention, and FIG. 18 in analogy to FIG. 12, the residual light spectrum resulting in an X-cube with combined solutions according to the invention according to the spectra of FIG. 17, with the spectrum of the HMI lamp Phillips UHP 120 W.

DESCRIPTION OF THE PREFERRED EMBODIMENTS

The results presented in the following in conjunction with FIGS. 8 to 12, were measured using a configuration such as is represented in principle in FIG. 2. An X-cube was provided with color-selective coating systems 5 or 7, respectively. The material with the higher refractive index in the coating systems 5, 7 was $TiO_2$, the material with the lower refractive index was a mixed material comprising $SiO_2$ and $TiO_2$ in a mixing ratio of $A_{SiO2}/A_{TiO2}=60/40$. The body of the X-cube comprised quartz glass.

The effects of the transmission, resulting in the reflection measurements on the particular noninvolved coating system—thus for blue light the red-selective system 7 and for red light the blue-selective system 5—in particular the transmission difference for S- and P-polarized red or blue light, respectively, were negligible.

Figure 8:
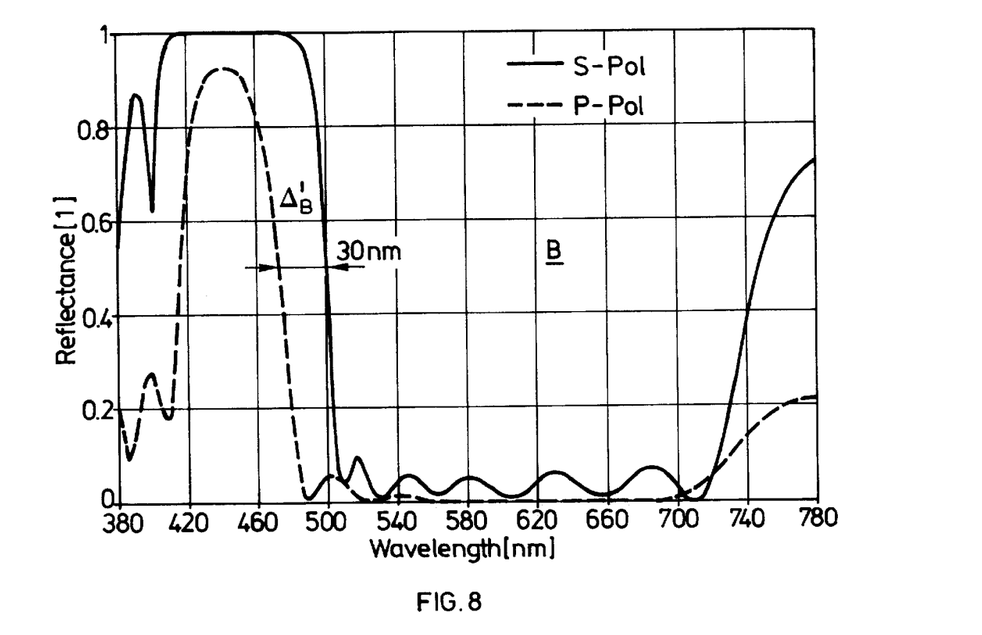
Figure 9:
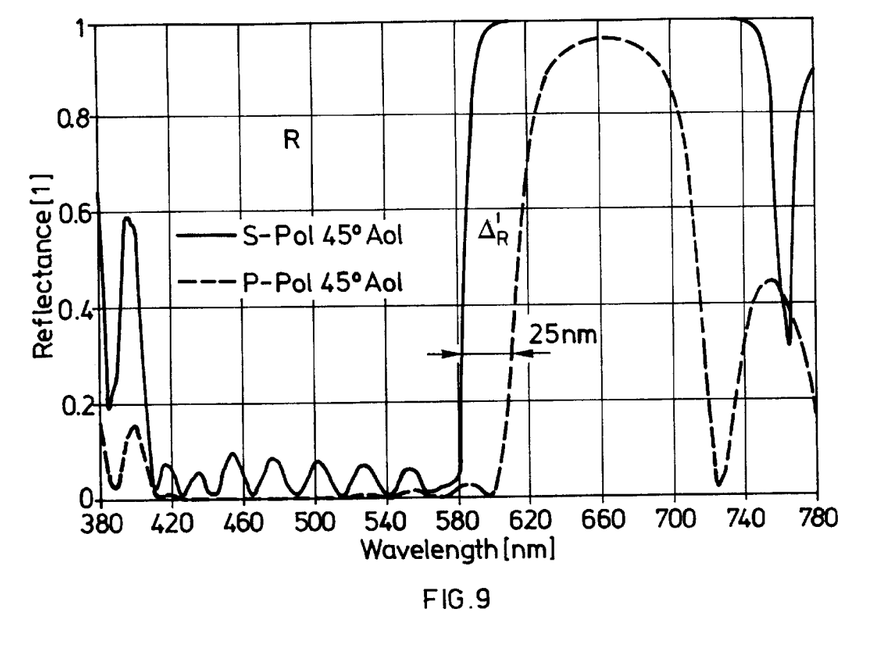

On the configuration of FIG. 2, in analogy to FIG. 3, in an X-cube with $TiO_2$ as the material with the higher refractive index and $SiO_2$ as the material with the lower refractive index on the light splitter according to the invention, were measured spectra for reflected blue light B in S- and P-polarization, represented in FIG. 8, and analogously for red light R in FIG. 9. The refractive index $N_{LS}$ within the range $$1.7 \leq N_{LS} \leq 2.1$$

was selected as 1.8±2%.

Due to the selection of said mixing ratio of the mixed material with lower refractive index, and thus the setting of the lower refractive index, a substantial reduction of the polarization shift $\Delta_B$ or $\Delta_R$, respectively, is attained and thus a substantial approximation of the reflection spectra edges of S- and P-polarized light. If, in the case of prior known optical structural components according to FIG. 3 at 50% reflection a polarization shift of 70 nm results between the reflection spectrum for S- and P-polarized light, in the case of the structural component according to the invention a polarization shift of only 30 nm is obtained for this light. Similarly, for red light at 30% reflection on the structural component according to the invention a polarization shift of only 25 nm results while the same value on prior known structural elements is 50 nm according to FIG. 4.

Further, the maximum reflection of P-polarized blue light according to the invention and according to FIG. 8, is approximately 92% of that of S-polarized blue light while in prior known structural components according to FIG. 3 this value is only 75%. As is readily apparent, with respect to red light, the maximum reflection attained according to the invention with P-polarization is 97% of that with S-polarization while in the case of prior known structural components according to FIG. 4, the former is only 40%.

Figure 10:
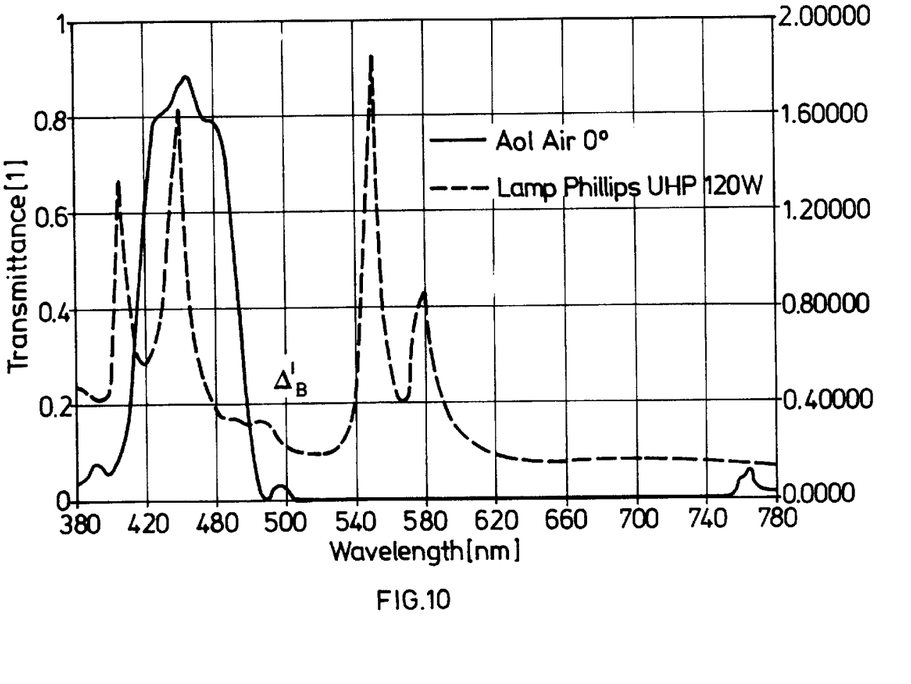
Figure 11:
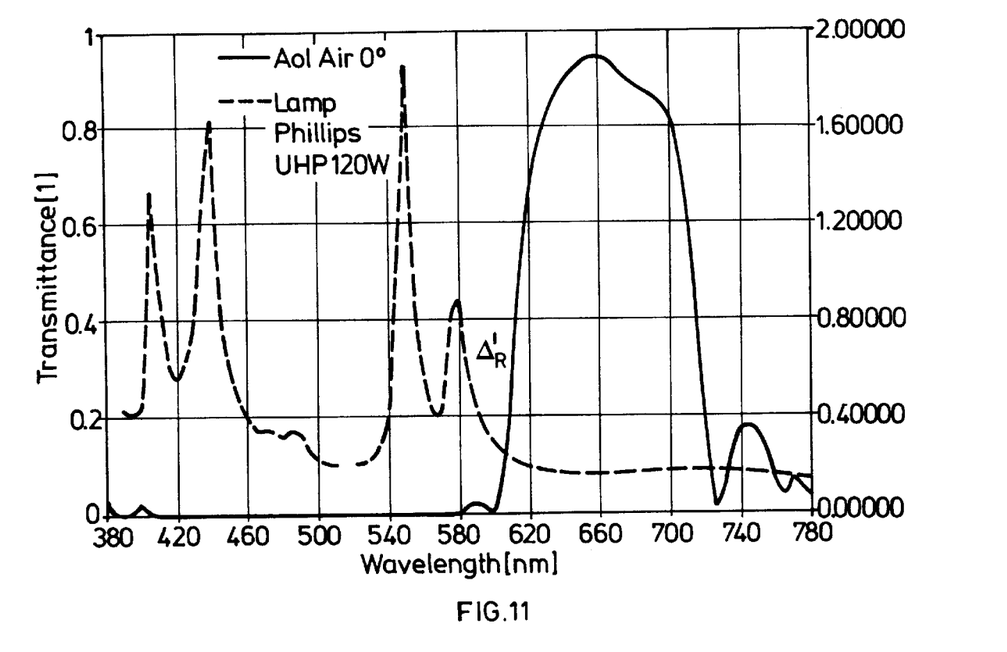

In FIG. 10 in the case of the system, according to FIG. 2, as defined above and structured according to the invention the total transmission of blue light is depicted and, correspondingly in FIG. 11, the total transmission of red light, thus over the light division on the X-cube, reflection on RLV and light recombination on the X-cube.

An HMI lamp, for example a lamp UHP 120 W by Phillips, yields the lamp spectrum Δ also entered in FIGS. 10 and 11. It is evident that the lamp spectrum has low energy or a low intensity where the blue light, due to the still remaining polarization shift $\Delta'_B$ according to FIG. 8, has a low transmission in any event. As is extremely advantageous, the lamp spectral line is additionally at 580 nm, corresponding to the yellow lines faded out through the coating system provided according to the invention (see FIG. 10), which prevents a green coloration of the blue component or orange coloration of the red component. Based on the comparison of the scattered light spectrum of FIG. 12 with that resulting on a conventional X-cube according to FIG. 7, it is evident that the total scattered light losses in the case of the light splitter, realized according to the invention with coating system materials selected according to the invention, are substantially less than in the case of a conventional light splitter of said type, in particular also if the light splitter according to the invention is combined with an HMI light source.

Figure 13:
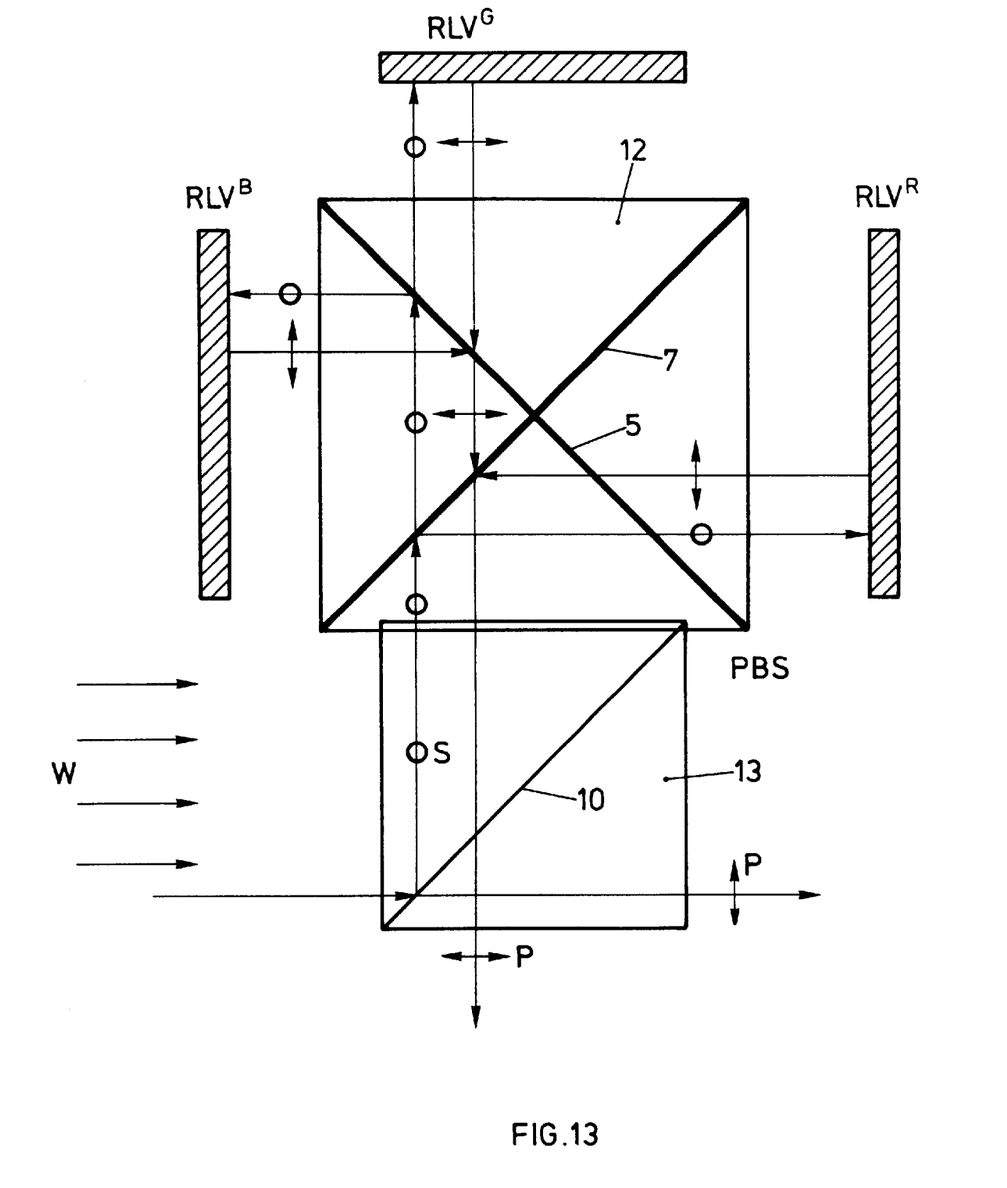

In FIG. 13 is depicted the realization of a projector according to the invention in which, due to the implementation according to the invention of the optical light splitter structured as an X-cube, namely with coating system materials selected according to the invention, light valves RLV operating in reflection are used.

White light, S-polarized or both, S- and P-polarized, is incident on a polarization beam splitter 13. The coating system 10 of the beam splitter, in known manner, has the property of deflecting S-polarized light by 90° and of allowing P-polarized light to pass. The P-polarized light can also be reflected back to the light source by means of a mirror (not shown). The S-polarized white light enters the X-cube 12, structured as explained in conjunction with FIG. 2 but comprising the coating system materials according to the invention. At the three emergent faces, corresponding to the three color channels, of the X-cube 12 are provided light valves $RLV^R$, $RLV^G$, and $RLV^B$, operating in reflection. With a change in the polarization, the light of the particular associated spectra is there reflected back in P-polarized form onto the associated color-selective reflection coating systems, implemented according to the invention, and output after recombination by the polarization beam splitter 13. Thus the light is split in the X-cube in S-polarization into RGB and in the same X-cube recombined from RGB in P-polarization. The P-polarized light can traverse unhindered through the polarizing beam splitter 13 and is projected via projection optics onto a (not shown) screen.

Figure 14:
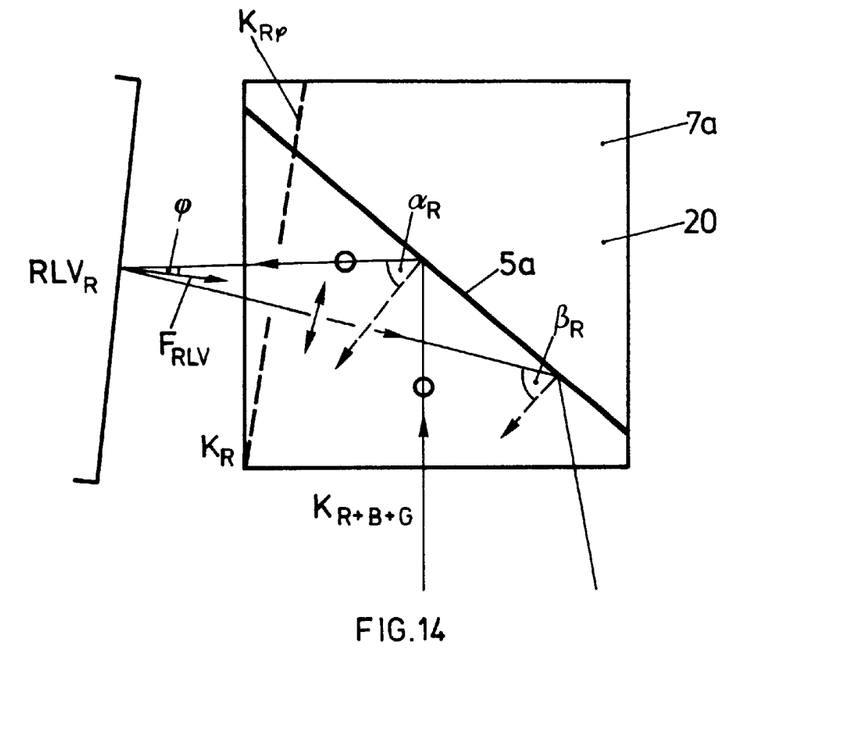

With reference to FIG. 14, the second solution according to the invention of the above posed task will be explained in principle, the solution of which, as already mentioned, can be optimally combined with the just described solution, namely the special coating system material selection.

Again, the problem to be solved is given thereby that, as has been explained in connection with FIGS. 3 and 4, on the particular coating systems of a light splitter a decisive polarization shift of the reflected spectra, corresponding to $\Delta_B$ and $\Delta_R$, is generated.

In principle, and in view of said Figures, is to be attained:
- to shift the spectral edge of the reflected red light in S-polarization (see FIG. 4) toward longer wavelengths;
- to shift the spectral edge of the reflected red light in P-polarization toward shorter wavelengths;
- to shift the spectral edge of the reflected blue light in S-polarization toward shorter wavelengths; and
- to shift the spectral edge of the reflected blue light in P-polarization toward longer wavelengths.

It is highly surprising that all of these conditions can, in principle, be met thereby that the angle of incidence for P- and S-polarized light on the associated coating systems are selected so as to be different. This approach will be explained in principle with reference to FIG. 14. Apart from conditions yet to be explained, this Figure shows schematically an X-cube 20 with the one coating system 5a—the red reflector—as well as a light valve RLV operating in reflection and, for the sake of clarity, shown only for one channel.

Essential in the solution according to the invention is that the light incident on RLV arrives on RLV at an angle $\phi$, deviating from 0°, with respect to the face normal $F_{RLV}$ and no longer, as for example according to FIGS. 2 or 13, at an angle $\phi=0°$.

The requirements made of the spectrum of the red light for a decrease of the polarization shift according to FIG. 4 are now met thereby that the angle of reflection $\alpha_R$ for the S-polarized red light is selected to be smaller than the angle $\beta$ for the P-polarized red light.

Figure 15:
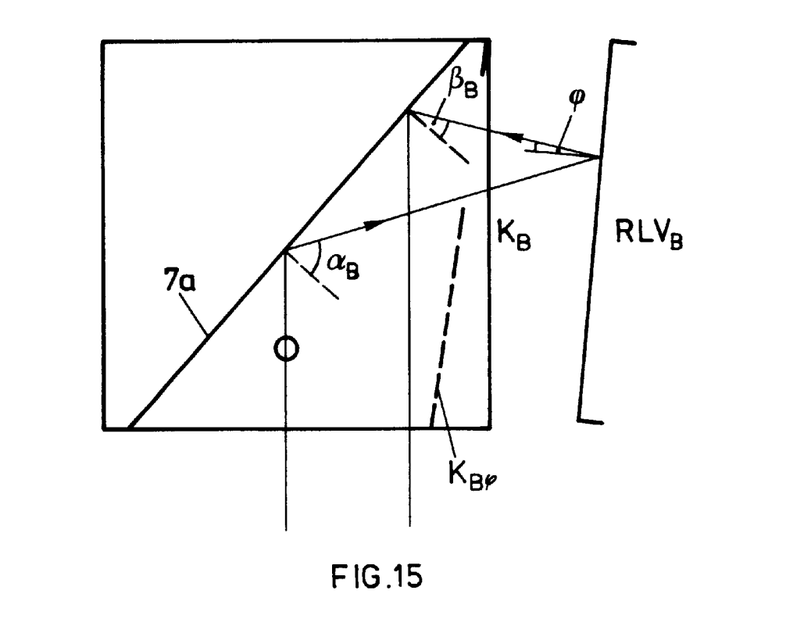

Conversely, the conditions with respect to polarization shift of the spectra of the blue light are met thereby that, as shown in FIG. 15, the angle of reflection $\alpha_B$ of the blue light in S-polarization on the coating system 7a is greater than the angle of reflection $\beta_B$ of the blue light reflected by the associated light valve RLV. According to FIGS. 14, 15 on the red reflector or blue reflector coating system 5a, 7a obtains $\beta_R = \alpha_R + 2_\phi$ $\beta_B = \alpha_B - 2_\phi$.

Angle $\alpha$ is controlled through the geometric relative position of the coating system 5a according to FIG. 14 with respect to the direction of the light incident on channel $K_{R+B+G}$, angle $\beta$ as a function of this angle of incidence $\alpha$ as well as the angular orientation of the reflector on RLV with respect to the light emergent at channel $K_R$ or $K_B$.

With respect to red light as well as also with respect to blue light, in a preferred embodiment the particular angle $\alpha$ and $\beta$ is symmetrically 45°. If the deviation of the particular angles $\alpha$, $\beta$ from 45° is denoted by $\delta$, $45° \pm \delta = \alpha$ $45° \pm \delta = \beta$ is obtained where the upper sign applies in each case for blue light at reflector 7a according to FIG. 15, the lower sign for the conditions at the red channel with reflector 5a according to FIG. 14. Therefrom results $\phi = \delta$.

In a further preferred embodiment, $\delta$ is selected as $0 < \delta \leq 5°$.

It follows that on the light valve $RLV_R$, associated with the red channel $K_R$, and/or on light valve $RLV_B$, associated with the blue channel $K_B$, preferable on both, the incident light is to be reflected at an angle $\phi$ greater than 0° and preferably maximally 5°. Since small angles of incidence $\phi$ which deviate from 0° can also be caused by fabrication, this angle $\phi$ of 0° can be selected to deviate to an extent which is above that caused by fabrication tolerances.

As is readily evident in FIGS. 14 and 15, the particular angle $\alpha$ is determined by the relative orientation of the particular coating system 7a or 5a and the direction of light incidence of the light entering through channel $K_{R+B+G}$ for white light.

The geometric conditions according to the invention on light splitters and valves RLV, in particular X-cubes and light valves RLV, as shown qualitatively in FIGS. 14 and 15, can be realized through specific formation of the X-cube or the light splitter itself, namely by tilting their emergent faces corresponding to $K_R$ or $K_B$ as well as their coating systems 5a and 7a and direct application of the valves on the tilted faces (in FIGS. 14, 15 in dashed lines at $K_{R\phi}$, $K_{B\phi}$. Alternatively—and simpler—the "tilting" is realized through the corresponding positioning of the RLVs and the implementation of illumination or recombination optics, with the X-cube or light splitter remaining geometrically unchanged.

Figure 16:
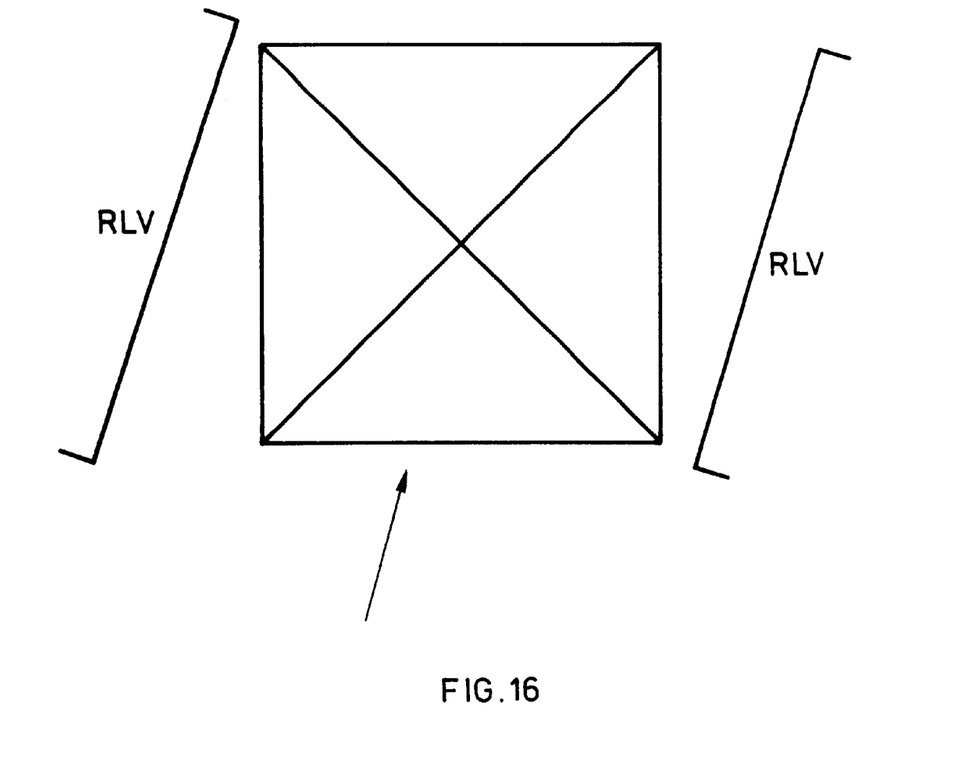

A simple realization form results according to FIG. 16 and, as readily comprehensible based on the combined consideration of FIGS. 14 and 15, thereby that an X-cube, such as shown for example in conjunction with FIG. 2, is tilted with respect, for example, to light valves RLV disposed in parallel.

Figure 17:
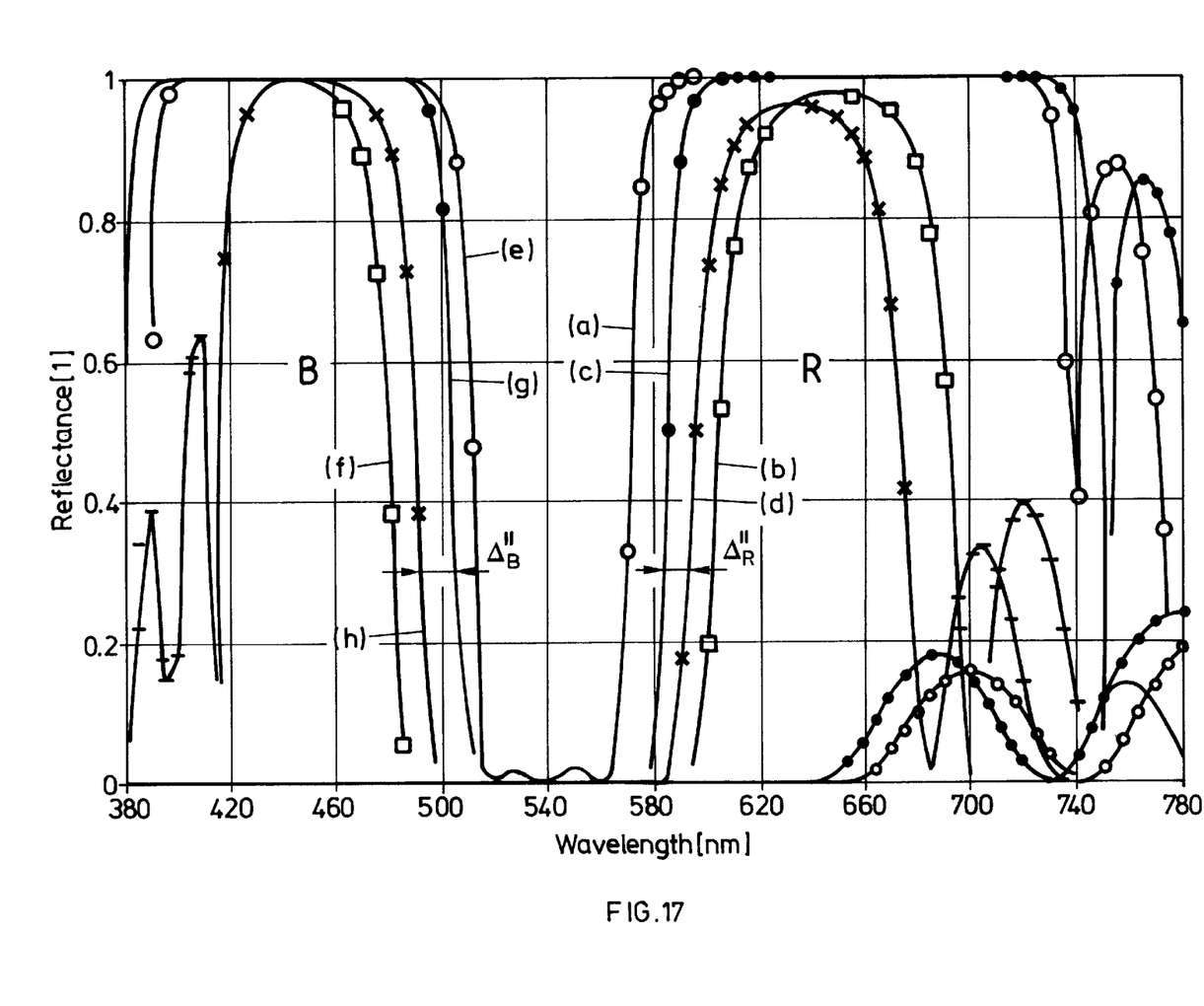

In FIG. 17 several spectra for red and blue light are shown, as measured on an X-cube on which both solutions according to the invention were combined, namely, on the one hand, material selection of the coating systems according to the invention, and, on the other hand, layout of the angle of incidence according to the invention. These spectra were measured on X-cubes leading already to the above described spectra according to FIGS. 8 and 9.

In the red spectra of FIG. 17 denote:
(a): the spectrum of the reflected S-polarized red light at an angle of incidence $\alpha_R$ according to FIG. 14 on the red reflector 5, according to the invention, of 45°. This spectrum corresponds to the one spectrum of FIG. 9.
(b): The spectrum of the reflected P-polarized red light reflected on the red reflector 5, according to the invention, at $\beta_R=45°$.

These spectra, again, show clearly the reduction attained of the polarization shift according to FIG. 9 according to the invention, through the selection of the material of the coating systems.

(c): The spectrum of S-polarized red light on the same red reflector 5 according to the invention, reflected at $\alpha_R=42°$.
(d): The spectrum of P-polarized red light reflected on the same red reflector 5 at $\beta_R=48°$.

Comparison of the spectra (c) and (d) shows readily that the remaining polarization shift $\Delta''_R$ is again reduced by practically 50% through the specific polarization-dependent layout of the angles of incidence $\alpha_R$, $\beta_R$.

In the blue spectra B of FIG. 17 denote:
(e): The spectrum of reflected S-polarized blue light reflected on the blue reflector 7, laid out according to the invention with respect to the layer materials, at an angle of incidence $\alpha_B=45°$.
(f): The spectrum of the reflected P-polarized blue light on the blue reflector 7, according to the invention, with $\beta_B=45°$.

This spectrum corresponds to that of FIG. 8.

Between spectra (e) and (f) the polarization shift $\Delta'_B$ according to FIG. 8 is evident.

(g): The spectrum of the S-polarized blue light reflected on the blue reflector 7 implemented according to the invention, with $\alpha_B=48°$.
(h): The spectrum of the P-polarized blue light reflected on the blue reflector 7 implemented according to the invention, with $\beta_B=42°$.

Again, spectra (g) and (h) reveal the further reduction of the polarization shift with respect to that attained already through the layer material selection alone according to the invention according to FIG. 8.

Figure 12:
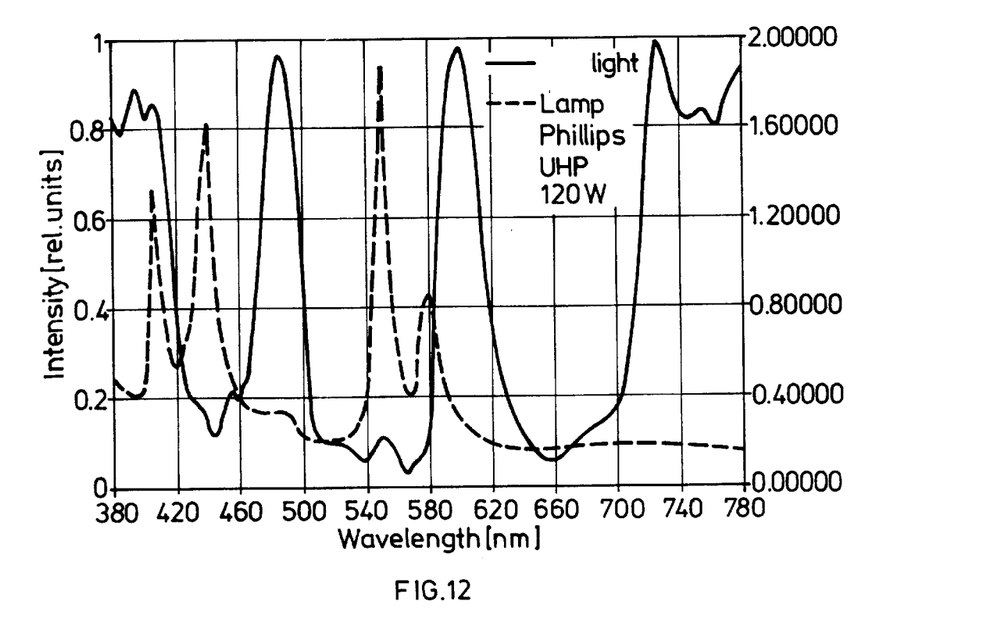
Figure 18:
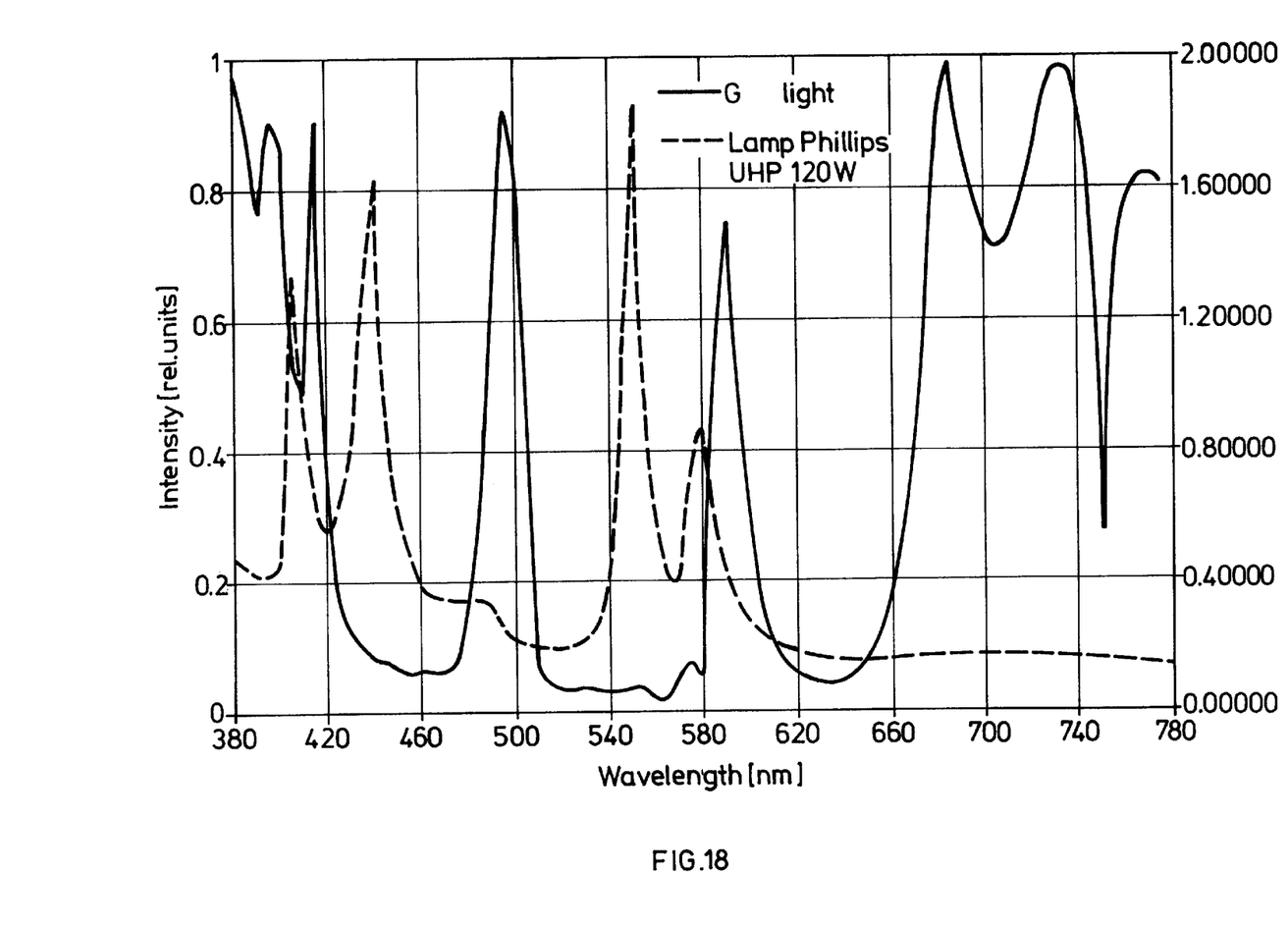

In FIG. 18, in analogy to the representation according to FIG. 12, on the one hand, the spectrum of an HMI lamp, namely the UHP 120 W by Philips, is shown, on the other hand, the spectrum of scattered light, attained with an X-cube with the coating systems laid out according to the invention as well as with the polarization-specific layout of the angles of incidence α, β according to the spectra of FIG. 17.

It is readily possible to implement on the light splitter according to the invention, in particular an X-cube, for example only the coating system 5 forming the red reflector with the materials according to the invention and to realize the layout of the angles of incidence according to the invention, for example according to FIG. 16, by tilting the X-cube.

What is claimed is:

1. Spectrally selective light splitter and recombining device, which divides white light into red, green and blue light being output and recombines red, green and blue light being input substantially independently of light polarization, comprising:

two coating systems, each reflecting and transmitting color selectively, said coating system being embedded in at least one transparent base body;

least one of the coating systems comprising at least one layer of a material with lower refractive index as well as at least one layer of a material with higher refractive index, wherein for the lower refractive index $N_{LS}$:

$$1.7 \leq N_{LS} \leq 2.1;$$

and wherein, for a refractive index $N_k$ of the at least one transparent base body:

$$1.52 \geq N_K \geq 1.$$

2. Light splitter as claimed in claim 1, wherein $$N_{LS} = 1.8 \pm 2\%$$

applies.

3. Light splitter as claimed in claim 1, wherein material with the lower refractive index is a mixed material comprising at least two materials $m_1$, $m_2$, to which materials applies:

$$N_{m1} \geq 1.05 N_{LS}$$

$$N_{m2} \leq 0.95 N_{LS}.$$

4. Light splitter as claimed in claim 1, wherein the material with the higher refractive index substantially comprises at least an oxide or oxynitride.

5. Light splitter as claimed in claim 1, wherein the material with the lower refractive index comprises at least one of the following materials:

$TiO_2$, $Ta_2O_5$, $Nb_2O_5$, $HfO_2$, $ZrO_2$, $SiO_xN_y$, and the material with the lower refractive index comprises predominantly $SiO_2$ and $TiO_2$, with a ratio of the fractions of  $A_{SiO2} = (60 \pm 5)\%$ and $A_{TiO2} = (100\% - A_{SiO2})$.

6. Light splitter as claimed in claim 1, wherein the material with the lower refractive index comprises $Y_2O_3$.

7. Light splitter as claimed in claim 1, wherein for the refractive index $N_k$ of the material of the at least one base body applies:

$$N_k = 1.45 \pm 2\%.$$

8. Light splitter as claimed in claim 1, wherein both coating systems are implemented like said at least one coating system.

9. Light splitter implemented as an X-cube according to claim 1, in which the coating systems are substantially embedded along diagonal planes of a base body cuboid, which is, at least approximately, square considered in a cutting plane perpendicular to the common line of intersection of the coating systems.

10. Light splitter as claimed in claim 1, wherein at least one of the emergent faces for the light reflected on at least one of the coating system and resulting from the splitting, is disposed tilted with respect to the direction of emergence of this light such that its face normal forms with said direction an angle φ deviating from zero and specifically by more than is caused by fabrication tolerances of the light splitter, for which applies:

$$\phi \leq 5°.$$

11. Spectrally selective light splitter and recombining device, which divides white light into red, green and blue light or being output at respective output surfaces and recombines red, green and blue light input to respective ones of said output surfaces, with two separate coating systems, each reflecting or transmitting color-selectively, which are applied or embedded on or in at least one transparent base body, which at least one body determines an emergent face each for the red, green and blue light, wherein at least one emergent face is tilted with respect to the direction of the light emergent from it and reflected on at least one of the coating systems such that its face normal forms with this direction an angle φ, deviating from zero, and specifically by more than is caused by a fabrication tolerances of the light splitter, for which applies:

$$\phi \leq 5°.$$

12. The device of claim 11, wherein at least one of the coating systems comprises at least one layer of a material with lower refractive index as well as at least one layer of a material with higher refractive index, wherein for the lower refractive index $N_{LS}$: $1.7 \leq N_{LS} \leq 2.1$; and wherein, for a refractive index $N_k$ of the at least one transparent base body: $1.52 \geq N_K \geq 1$.

13. The device of claim 12, wherein $N_{LS} = 1.8 \pm 2\%$.

14. The device of claim 12, wherein the material with the lower refractive index is a mixed material comprising at least two materials $m_1$, $m_2$, to which materials:

$$N_{m1} \geq 1.05 N_{LS}$$

and

$$N_{m2} \leq 0.95 N_{LS}.$$

15. The device of claim 12, wherein the material with the higher refractive index substantially comprises at least an oxide or oxynitride.

16. The device of claim 12, wherein the material with the lower refractive index comprises at least one of the following materials:

$TiO_2$, $Ta_2O_5$, $Nb_2O_5$, $HfO_2$, $ZrO_2$, $SiO_xN_y$, and the material with the lower refractive index comprises predominantly $SiO_2$ and $TiO_2$, with a ratio of the fractions of $A_{SiO2}=(60\pm5)\%$ and $A_{TiO2}=(100\%-A_{SiO2})$.

17. The device of claim 12, wherein the material with the lower refractive index comprises $Y_2O_3$.

18. The device of claim 12, wherein the refractive index $N_k$ of the material of the at least one base body is: $N_k=1.45\pm2\%$.

19. The device of claim 12, wherein both coating systems are implemented like said at least one coating system.

20. The device of claim 12, implemented as an X-cube in which the coating systems are substantially embedded along diagonal planes of a base body cuboid, which is at least approximately, square considered in a cutting plane perpendicular to the common line of intersection of the coating systems.

21. The device of claim 12, wherein at least one of the emergent faces for the light reflected on at least one of the coating systems and resulting from the splitting, is disposed tilted with respect to the direction of emergence of this light such that its face normal forms with said direction an angle φ deviating from zero and specifically by more than is caused by fabrication tolerances of the light splitter, for which: $\phi \leq 5°$.

22. The device of claim 11, implemented as an X-cube.

23. The device of claim 11, including, adjacent said output surfaces, reflectors for respective of said output light, which reflectors change polarity of light as reflected and wherein light output from respective ones of said output surfaces is reflected at an adjacent surface of respective ones of said reflectors under an angle which deviates more from 0° than caused by manufacturing tolerances of the device, and wherein each of the reflectors is formed by configurations of reflecting light valves.

24. The device of claim 23, wherein the light is reflected on the reflectors at an angle φ wherein: $0°<\phi \leq 5°$, with the angle deviating from zero by more than is caused by fabrication tolerances.

25. The device of claim 23, wherein the light reflection at the specified angle takes place on more than one of the reflectors.

26. The device of claim 23, wherein an incident face of the light splitter for the light to be divided comprises one of a polarization beam splitter and an HMI lamp as the illumination source for the incident face.

27. Optical transmission arrangement with a light splitting and recombining device which device divides white light into red, green and blue light being output at respective output surfaces and recombines red, green and blue light input to respective ones of said output surfaces, further comprising, adjacent to said output surfaces, reflectors for respective of said output light, which reflectors change polarity of light as reflected and wherein light output from respective ones of said output surfaces is reflected at an adjacent surface of respective ones of said reflectors under an angle which deviates more from 0° than caused by manufacturing tolerances of the arrangement.

28. An arrangement as claimed in claim 27, wherein the light splitter an X-cube.

29. An arrangement as claimed in one of claim 27 wherein each of the reflectors is formed by configurations of reflecting light valves, preferably each by LCD configurations.

30. An arrangement as claimed in one of claims 27 wherein the light is reflected on the reflectors at an angle φ for which applies $0°<\phi \leq 5°$, with the angle deviating from zero by more than is caused by fabrication tolerances.

31. An arrangement as claimed in one of claim 27 wherein the light reflection at the specified angle takes place on more than one of the reflectors.

32. Optical transmitter configuration as claimed in claim 27 wherein an incident face of the light splitter for the light to be divided comprises one of a polarization beam splitter and/an HMI lamp as the illumination source for the incident face.

33. The arrangement of claim 27, wherein at least one of the coating systems comprises at least one layer of a material with lower refractive index as well as at least one layer of a material with higher refractive index, wherein for the lower refractive index $N_{LS}$: $1.7 \leq N_{LS} \leq 2.1$; and wherein, for a refractive index $N_k$ of the at least one transparent base body: $1.52 \geq N_K \geq 1$.

34. The arrangement of claim 33, wherein $N_{LS}=1.8\pm2\%$.

35. The arrangement of claim 33, wherein the material with the lower refractive index is a mixed material comprising at least two materials $m_1$, $m_2$, to which materials:

$N_{m1} \geq 1.05 N_{LS}$ and $N_{m2} \leq 0.95 N_{LS}$.

36. The arrangement of claim 33, wherein the material with the higher refractive index substantially comprises at least an oxide or oxynitride.

37. The arrangement of claim 33, wherein the material with the lower refractive index comprises at least one of the following materials:

$TiO_2$, $Ta_2O_5$, $Nb_2O_5$, $HfO_2$, $ZrO_2$, $SiO_xN_y$, and the material with the lower refractive index comprises predominantly $SiO_2$ and $TiO_2$, with a ratio of the fractions of $A_{SiO2}=(60\pm5)\%$ and $A_{TiO2}=(100\%-A_{SiO2})$.

38. The arrangement of claim 33, wherein the material with the lower refractive index comprises $Y_2O_3$.

39. The arrangement of claim 33, wherein the refractive index $N_k$ of the material of the at least one base body is: $N_k=1.45\pm2\%$.

40. The arrangement of claim 33, wherein both coating systems are implemented like said at least one coating system.

41. The arrangement of claim 33, implemented as an X-cube in which the coating systems are substantially embedded along diagonal planes of a base body cuboid, which is at least approximately, square considered in a cutting plane perpendicular to the common line of intersection of the coating systems.

42. The arrangement of claim 33, wherein at least one of the emergent faces for the light reflected on at least one of the coating systems and resulting from the splitting, is disposed tilted with respect to the direction of emergence of this light such that its face normal forms with said direction an angle φ deviating from zero and specifically by more than is caused by fabrication tolerances of the light splitter, for which:

$$\phi \leq 5°.$$

43. Spectrally selective light splitting and recombining device, which device divides white light into red, green and blue light being output at respective output surfaces and recombines red, green and blue light input to respective ones of said output surfaces, said spectrally selective light splitting and recombining device defining for central propagation axes of output red, green and blue light wherein said output surfaces define for a surface normal being warped with respect to said respective axis by an angle for which there applies $$\phi \leq 5°.$$

44. The device of claim 43, including at least two coating systems, each reflecting and transmitting color selectively, said coating system being applied or embedded on or in at least one transparent base body, and wherein at least one of the coating systems comprises at least one layer of a material with lower refractive index as well as at least one layer of a material with higher refractive index, wherein for the lower refractive index $N_{LS}$:

$$1.7 \leq N_{LS} \leq 2.1;$$

and wherein, for a refractive index $N_k$ of the at least one transparent base body: $1.52 \geq N_{K \geq 1}$.

45. The device of claim 44, wherein $N_{LS}=1.8\pm2\%$.
46. The device of claim 44, wherein the material with the lower refractive index is a mixed material comprising at least two materials $m_1$, $m_2$, to which materials:

$$N_{m1} \geq 1.05 N_{LS}$$

and $$N_{m2} \leq 0.95 N_{LS}.$$

47. The device of claim 44, wherein the material with the higher refractive index substantially comprises at least an oxide or oxynitride.
48. The device of claim 44, wherein the material with the lower refractive index comprises at least one of the following materials:

$$TiO_2, Ta_2O_5, Nb_2O_5, HfO_2, ZrO_2, SiO_xN_y,$$

and the material with the lower refractive index comprises predominantly $SiO_2$ and $TiO_2$, with a ratio of the fractions of $$A_{SiO2}=(60\pm5)\% \text{ and } A_{TiO2}=(100\%-A_{SiO2}).$$

49. The device of claim 44, wherein the material with the lower refractive index comprises $Y_2O_3$.
50. The device of claim 44, wherein the refractive index $N_k$ of the material of the at least one base body is: $N_k=1.45\pm2\%$.
51. The device of claim 44, wherein both coating systems are implemented like said at least one coating system.
52. The device of claim 44, implemented as an X-cube in which the coating systems are substantially embedded along diagonal planes of a base body cuboid, which is at least approximately, square considered in a cutting plane perpendicular to the common line of intersection of the coating systems.
53. The device of claim 43, including at least one emergent face for the light reflected on at least one of the coating systems and resulting from the splitting, is disposed tilted with respect to the direction of emergence of this light such that its face normal forms with said direction an angle φ deviating from zero and specifically by more than is caused by fabrication tolerances of the light splitter, for which: $\phi \leq 5°$.
54. The device of claim 43, implemented as an X-cube.
55. The device of claim 43, including, adjacent said output surfaces, reflectors for respective of said output light, which reflectors change polarity of light as reflected and wherein light output from respective ones of said output surfaces is reflected at an adjacent surface of respective ones of said reflectors under an angle which deviates more from 0° than caused by manufacturing tolerances of the device, and wherein each of the reflectors is formed by configurations of reflecting light valves.
56. The device of claim 55, wherein the light is reflected on the reflectors at an angle φ wherein: $0° < \phi \leq 5°$, with the angle deviating from zero by more than is caused by fabrication tolerances.
57. The device of claim 55, wherein the light reflection at the specified angle takes place on more than one of the reflectors.
58. The device of claim 55, wherein an incident face of the light splitter for the light to be divided comprises one of a polarization beam splitter and an HMI lamp as the illumination source for the incident face.

* * * * *